United States Patent
Tharaldson et al.

(10) Patent No.: US 9,846,102 B2
(45) Date of Patent: Dec. 19, 2017

(54) SYSTEM AND METHOD FOR DIAGNOSING A FIELD DEVICE

(71) Applicant: TESCOM CORPORATION, Elk River, MN (US)

(72) Inventors: Linda Rose Tharaldson, Oak Grove, MN (US); Gordon Cameron Muir, Maple Grove, MN (US); Jeffrey Allen Wakefield, Big Lake, MN (US)

(73) Assignee: TESCOM CORPORATION, Elk River, MN (US)

( * ) Notice: Subject to any disclaimer, the term of this patent is extended or adjusted under 35 U.S.C. 154(b) by 755 days.

(21) Appl. No.: 14/294,965

(22) Filed: Jun. 3, 2014

(65) Prior Publication Data

US 2014/0352408 A1 Dec. 4, 2014

Related U.S. Application Data (60) Provisional application No. 61/830,490, filed on Jun. 3, 2013.

(51) Int. Cl.
| | |
|---|---|
| *G06F 11/30* | (2006.01) |
| *G01M 3/04* | (2006.01) |
| *G01M 3/08* | (2006.01) |
| *G01M 3/00* | (2006.01) |
| *G05B 23/02* | (2006.01) |

(52) U.S. Cl.
CPC .......... *G01M 3/00* (2013.01); *G05B 23/0256* (2013.01)

(58) Field of Classification Search
CPC .......... G05B 23/0256; G05B 23/0283; G05B 19/0428; G05B 2219/32194; G01M 3/00

USPC .............. 702/127, 182, 183; 73/37, 40, 46
See application file for complete search history.

(56) References Cited

U.S. PATENT DOCUMENTS

| | | | |
|---|---|---|---|
| 5,970,430 A | 10/1999 | Burns et al. | |
| 6,975,966 B2 * | 12/2005 | Scott .................. | G05B 23/0272 700/4 |
| 8,649,888 B2 * | 2/2014 | Daraiseh ............ | G05B 19/4184 340/3.43 |

(Continued)

FOREIGN PATENT DOCUMENTS

| | | |
|---|---|---|
| CN | 202 522 297 U | 11/2012 |
| DE | 101 14 127 A1 | 9/2002 |
| DE | 102 43 782 A1 | 3/2004 |

OTHER PUBLICATIONS

The International Search Report and the Written Opinion of the International Searching Authority, dated Dec. 2, 2014, International Application No. PCT/US2014/040618 (16 pages).

(Continued)

*Primary Examiner* — An Do
(74) *Attorney, Agent, or Firm* — Marshall, Gerstein & Borun LLP (57) ABSTRACT

A diagnostic system and method for a pressure regulator in a process plant is provided. The diagnostic apparatus includes a processor operatively coupled to the pressure regulator; a memory operatively coupled to the processor; and a sensor operatively coupled to an inlet valve of the pressure regulator, an exhaust valve of the pressure regulator, and the processor. A diagnostic module is stored in the memory, and when executed by the processor, presents a diagnostic tool at a user interface.

22 Claims, 8 Drawing Sheets

(56) References Cited

U.S. PATENT DOCUMENTS 9,371,925 B2 * 6/2016 Vasquez ............. G05D 16/0633
2004/0148130 A1 7/2004 Scott et al.

OTHER PUBLICATIONS

International Preliminary Report on Patentability and Written Opinion for International Application No. PCT/US2014/040618, dated Dec. 8, 2015 (10 pages).
The Partial International Search Report of the International Searching Authority, dated Oct. 2, 2014, International Application No. PCT/US2014/040618 (2 pages).

* cited by examiner

| Controller Diagnostic Tools |
|---|
| Tuning Tips |

SYSTEM AND METHOD FOR DIAGNOSING A FIELD DEVICE

CROSS-REFERENCE TO RELATED APPLICATION

The present application claims the benefit of U.S. Provisional Patent Application No. 61/830,490, filed on Jun. 3, 2013, the entire disclosure of which is hereby incorporated by reference herein for all purposes.

FIELD OF THE DISCLOSURE

The present disclosure is directed to process control systems and, more particularly, to assessing the integrity level of a field device, e.g., pressure regulator, and components thereof.

BACKGROUND

Process control systems, such as distributed or scalable process control systems like those used in chemical, petroleum or other processes, typically include one or more process controllers communicatively coupled to at least one host or user workstation and to one or more field devices via analog, digital or combined analog/digital buses. The field devices, which may include, for example, control valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals, which are sent over the buses to the field devices to control the operation of the process. Information from each of the field devices and the controller is typically made available to one or more applications executed by the user workstation to enable an operator to perform any desired function regarding the process, such as viewing the current state of the process, modifying the operation of the process, etc. In the event that a field device fails, the operational state of the entire process control system can be jeopardized.

SUMMARY

One aspect of the present disclosure includes a method for diagnosing a pressure regulator in a process control system. The method includes receiving a request to execute a diagnostic application, wherein the request is initiated from a user interface communicably coupled to the process control system. The method includes displaying a diagnostics page in response to receiving a request to execute a diagnostic application, wherein the diagnostic page includes a selectable item associated with a diagnostic tool. The method receives a selection of the selectable item and automatically executes a command associated with the diagnostic tool.

Another aspect of the present disclosure includes a diagnostic apparatus for a control system having a controller operatively connected to a pressure regulator. The diagnostic apparatus includes a processor operatively coupled to the pressure regulator; a memory operatively coupled to the processor; a sensor operatively coupled to an inlet valve of the pressure regulator, an exhaust valve of the pressure regulator, and the processor; a user interface operatively coupled to the processor; and a diagnostic module stored in the memory, which when executed by the processor, presents a diagnostic tool at the user interface.

A further aspect of the present disclosure includes a tangible computer readable-medium having instructions stored thereon that, when executed by one or more processors, causes the one or more processors to: display a message requesting confirmation that an outlet port of the pressure regulator has been plugged and isolated, receive a confirmation that the outlet port has been plugged and isolated, transmit a signal to set the pressure at a location associated with the output port to an inlet valve pressure level, monitor the inlet valve pressure level, execute a first command if the inlet valve pressure level is at or above an inlet valve pressure threshold within a first period of time, execute a second command if the inlet valve pressure level is below the inlet valve pressure threshold within the first period of time, transmit a signal to set the pressure at the location associated with the output port to an exhaust valve pressure level, monitor the exhaust valve pressure level, execute a third command if the exhaust valve pressure level is at or below an exhaust valve pressure threshold within a second period of time, and execute a fourth command if the exhaust valve pressure level is above the exhaust valve pressure threshold within the second period of time.

In further accordance with the inventive aspects described herein, any one or more of the foregoing embodiments may further include any one or more of the following forms.

In one form, the diagnostic tool is a valve leak test, which when executed by the processor, automatically tests an inlet valve and/or an exhaust valve of the pressure regulator.

In another form, the valve leak test includes displaying a message requesting confirmation that an outlet port of the pressure regulator has been plugged and isolated, receiving a confirmation that the outlet port has been plugged and isolated, transmitting a signal to set the pressure at a location associated with the output port to an inlet valve pressure level, monitoring the inlet valve pressure level, executing a first command if the inlet valve pressure level is at or above an inlet valve pressure threshold within a first period of time, executing a second command if the inlet valve pressure level is below the inlet valve pressure threshold within the first period of time, transmitting a signal to set the pressure at the location associated with the output port to an exhaust valve pressure level. Monitoring the exhaust valve pressure level, executing a third command if the exhaust valve pressure level is at or below an exhaust valve pressure threshold within a second period of time, and executing a fourth command if the exhaust valve pressure level is above the exhaust valve pressure threshold within the second period of time.

In another form, execution of the first command displays a failure message associated with the inlet valve.

In another form, execution of the second command displays a pass message associated with the inlet valve.

In another form, execution of the third command displays a failure message associated with the exhaust valve.

In another form, execution of the fourth command displays a pass message associated with the exhaust valve.

In another form, the first period of time equals the second period of time.

In another form, the first period of time and/or the second period of time is 30 seconds.

In another form, the inlet valve threshold level is 0.3 psi above the set inlet valve pressure level.

In another form, the exhaust valve threshold level is 0.3 psi below the set exhaust valve pressure level.

In another form, the diagnostic tool is a system check, which when executed by the processor, automatically displays information at the user interface related to operational parameters of the pressure regulator.

In another form, the diagnostic tool is a mechanical regulator leak test, which when executed by the processor, automatically displays information for testing a mechanical regulator of the pressure regulator.

In another form, the diagnostic tool is a tuning procedure, which when executed by the processor, automatically displays information for tuning the pressure regulator.

In another form, the processor transmits an alert associated with the command to a workstation.

DETAILED DESCRIPTION

The present disclosure is directed to providing a diagnostic tool for checking a field device of a process control system such as a pressure regulator, for example.

Figure 1:
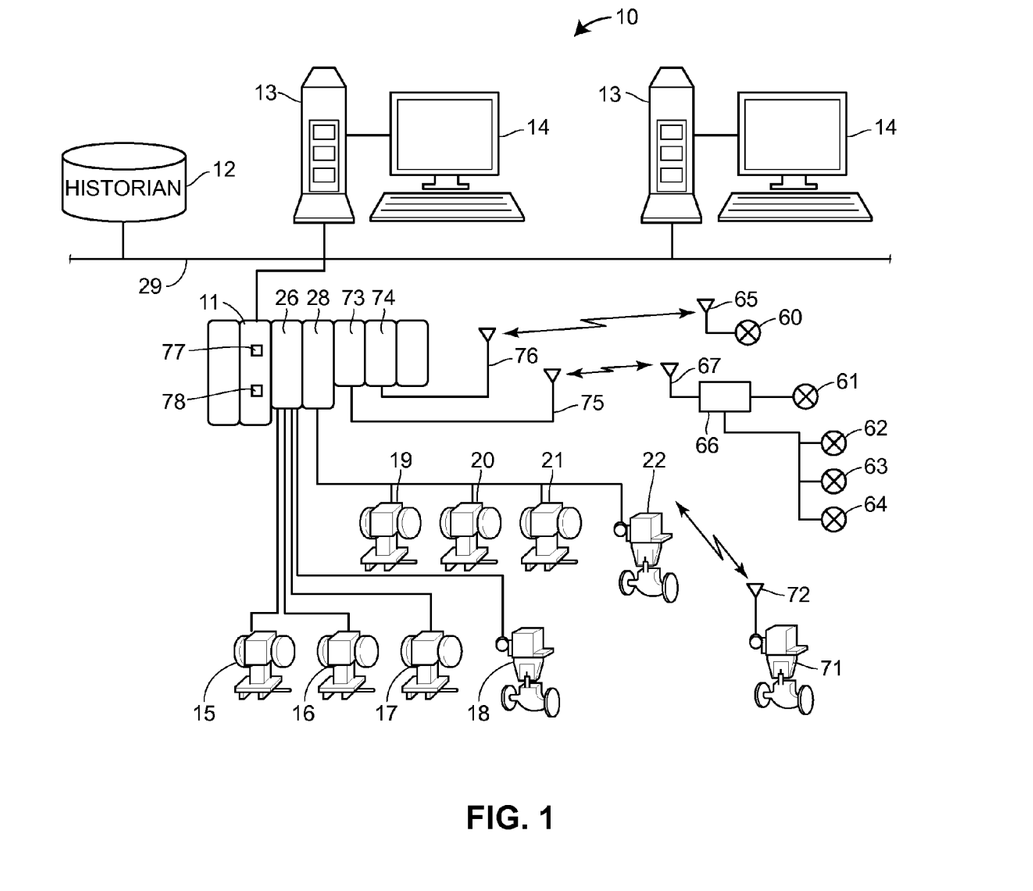
FIG. 1 is a schematic representation of a process control system having one or more field devices constructed in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, and 71 in communication with a process controller 11, which in turn, is in communication with a data historian 12 and one or more user workstations 13, each having a user interface 14, e.g., keyboard and display screen. So configured, the controller 11 delivers signals to and receives signals from the field devices 15, 16, 17, 18, 19, 20, 21, 22, and 71 and the workstations 13 to control the process control system 10.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware, or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme that may include the use of any desired hardware, software, and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, control valve assemblies, transmitters, positioners, etc., while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60, 61, 62, 63, 64 and 71 disposed in the plant to be controlled. The field devices 60, 61, 62, 63, 64 are depicted as transmitters (e.g., process variable sensors) while the field device 71 is depicted as a control valve assembly including, for example, a control valve and an actuator. Wireless communications may be established between the controller 11 and the field devices 60, 61, 62, 63, 64, 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, 64. Likewise, an antenna 72 is coupled to the control valve assembly 71 to perform wireless communications for the control valve assembly 71. The field devices or associated hardware 60, 61, 62, 63, 64, 66, 71 may implement protocol stack operations used by an appropriate wireless communication protocol to receive, decode, route, encode, and send wireless signals via the antennas 65, 67, 72 to implement wireless communications between the process controller 11 and the transmitters 60, 61, 62, 63, 64 and the control valve assembly 71.

If desired, the transmitters 60, 61, 62, 63, 64 can constitute the sole link between various process sensors (transmitters) and the process controller 11 and, as such, are relied upon to send accurate signals to the controller 11 to ensure that process performance is not compromised. The transmitters 60, 61, 62, 63, 64, often referred to as process variable transmitters (PVTs), therefore may play a significant role in the control of the overall control process. Additionally, the control valve assembly 71 may provide measurements made by sensors within the control valve assembly 71 or may provide other data generated by or computed by the control valve assembly 71 to the controller 11 as part of its operation. Of course, as is known, the control valve assembly 71 may also receive control signals from the controller 11 to effect physical parameters, e.g., flow, within the overall process.

The process controller 11 is coupled to one or more I/O devices 73, 74, each connected to a respective antenna 75, 76, and these I/O devices 73, 74 and antennas 75, 76 operate as transmitters/receivers to perform wireless communications with the wireless field devices 61, 62, 63, 64, 71 via one or more wireless communication networks. The wireless communications between the field devices (e.g., the transmitters 60, 61, 62, 63, 64 and the control valve assembly 71) may be performed using one or more known wireless communication protocols, such as the WirelessHART® protocol, the Ember protocol, a WiFi protocol, an IEEE wireless standard, etc. Still further, the I/O devices 73, 74 may implement protocol stack operations used by these communication protocols to receive, decode, route, encode, and send wireless signals via the antennas 75, 76 to implement wireless communications between the controller 11 and the transmitters 60, 61, 62, 63, 64 and the control valve assembly 71.

As illustrated in FIG. 1, the controller 11 conventionally includes a processor 77 that implements or oversees one or more process control and/or diagnostic routines (or any module, block, or sub-routine thereof) stored in a memory 78. The process control and/or diagnostic routines stored in the memory 78 may include or be associated with control loops being implemented within the process plant. Generally speaking, and as is generally known, the process controller 11 executes one or more control and/or diagnostic routines and communicates with the field devices 15, 16, 17, 18, 19, 20, 21, 22, 60, 61, 62, 63, 64, 71, the user workstations 13 and the data historian 12 to control and/or diagnose a process or device in any desired manner(s). Additionally, any one of the field devices 18, 22, 71 in FIG. 1, each of which is depicted as a control valve assembly, can include an intelligent control valve actuator constructed in accordance with the principles of the present disclosure for communicating with the process controller 11 in order to facilitate diagnosing and/or monitoring of the actuator's health and integrity.

Figure 2:
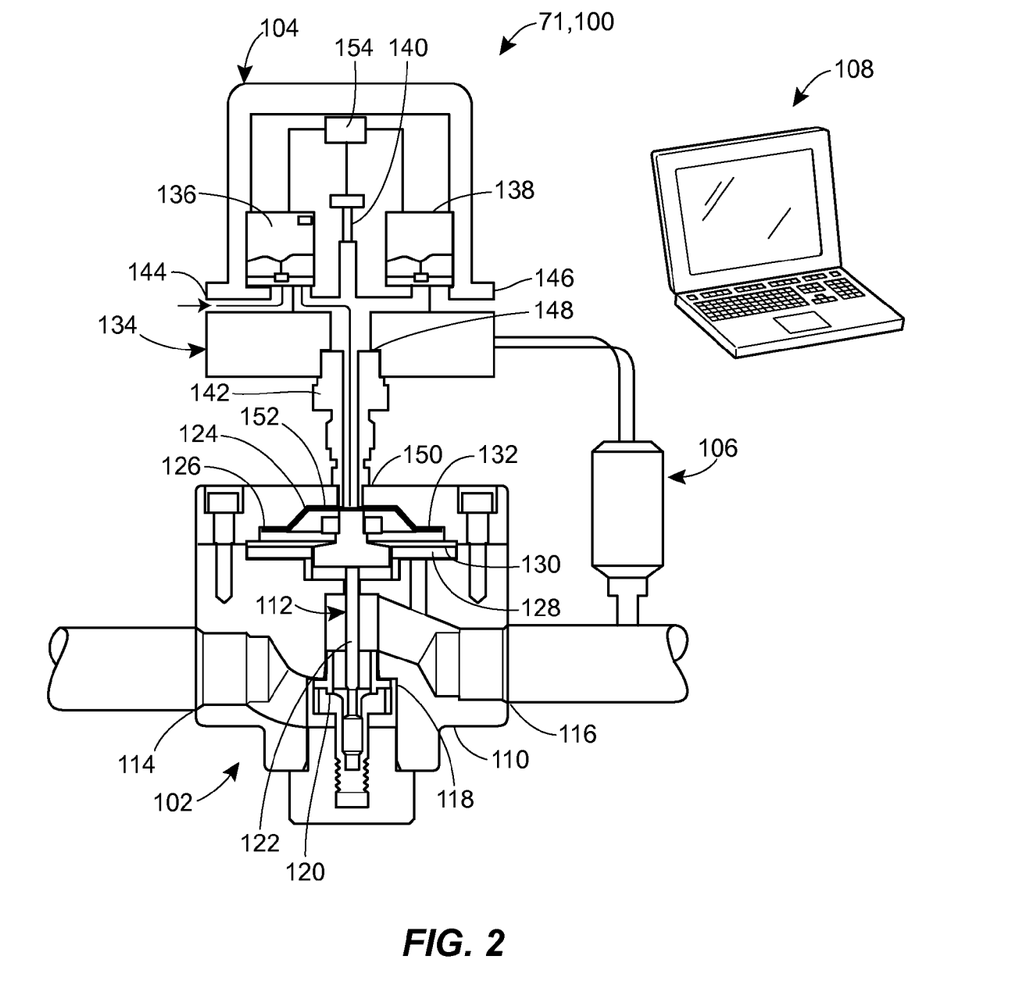
FIG. 2 is a cross-sectional side view of one version of an example valve regulator constructed in accordance with the principles of the present disclosure.

Referring now to FIG. 2, for the sake of description, field device 71 from FIG. 1 is shown as an intelligent regulator assembly 100 constructed in accordance with the principles of the present disclosure. In FIG. 2, the intelligent regulator assembly 100 includes a regulator 102, a pilot device 104, and a feedback pressure sensor 106. Additionally, FIG. 2 depicts an optional personal computing device 108 communicatively coupled to the pilot device 104 to enable user interaction with the pilot device 104, as will be described.

The regulator 102 includes a valve body 110 and a control assembly 112. The valve body 110 defines an inlet 114, an outlet 116, and a gallery 118 defining a seating surface 120. The control assembly 112 is carried within the valve body 110 and includes a control element 122 operably connected to a diaphragm assembly 124. The control element 122 is movable between a closed position in sealing engagement with the seating surface 120 and an open position spaced away from the seating surface 120 in response to pressure changes across the diaphragm assembly 124. As depicted, the diaphragm assembly 124 includes a diaphragm 126 disposed within a diaphragm cavity 128 of the valve body 110 of the regulator 102. A bottom surface 130 of the diaphragm 126 is in fluid communication with the outlet 116 of the valve body 110 and a top surface 132 of the diaphragm 126 is in fluid communication with the pilot device 104 via a pilot opening 150 in the valve body 110.

The pilot device 104 includes a valve body 134, an inlet valve 136, an exhaust valve 138, a pressure sensor 140, and an outlet adaptor 142. The valve body 134 defines an inlet port 144, an exhaust port 146, and an outlet port 148. The inlet port 144 is adapted to be connected to a source of supply gas for loading the dome 152 of the regulator 102, as will be described. As depicted, the inlet valve 136 is disposed adjacent to the inlet port 144, the exhaust valve 138 is disposed adjacent to the exhaust port 146, and the outlet adaptor 142 extends from the outlet port 148 and to the pilot opening 150 in the valve body 110. Thus, the outlet adaptor 142 provides fluid communication between the pilot device 104 and the regulator 102. The pressure sensor 140 is disposed in the valve body 134 of the pilot device 104 at a location between the inlet and exhaust (outlet) valves 136, 138. As such, the pressure sensor 140 is operable to sense the pressure between the inlet and exhaust valves 136, 138, as well as in the outlet port 148, the outlet adaptor 142, and the diaphragm cavity 128 adjacent to the top surface 132 of the diaphragm 126. This portion of the diaphragm cavity 128 can be referred to as the dome 152 of the regulator 102. In one version of the pilot device 104 the inlet and exhaust valves 136, 138 can be solenoid valves such as Pulse Width Modulation (PWM) solenoid valves and the pressure sensor 140 can be a pressure transducer. Moreover, the inlet and exhaust valves 136, 138 and the pressure sensor 140 can be communicatively coupled to an on-board controller 154 or a remote controller 108, which can store logic and/or direct some or all of the functionality of the pilot device 104, as will be described below.

Still referring to FIG. 2, the feedback pressure sensor 106 of the assembly 100 includes a pressure transducer arranged to detect the pressure at the outlet 116 of the regulator 102 and transmit signals to the pilot device 104 and, more particularly, to the on-board controller 154 of the pilot device 104. Based on the signals received by the on-board controller 154 from the feedback pressure sensor 106, the pilot device 104 opens and/or closes the inlet and exhaust valves 136, 138 to control the pressure in the dome 152 of the regulator 102, which in turn, controls the position of the control element 122 and ultimately the pressure at the outlet 116 of the regulator 102.

Specifically, during normal operation, the pressure at the outlet 116 of the regulator 102 is controlled and maintained as desired by adjusting the pressure in the dome 152 of the regulator 102. This is achieved via operation of the pilot device 104 and feedback pressure sensor 106. For example, in one version, the feedback pressure sensor 106 detects the pressure at the outlet 116 every 25 milliseconds and transmits a signal to the on-board controller 154 of the pilot device 104. The on-board controller 154 compares this signal, which is indicative of the pressure at the outlet 116, to a desired set-point pressure and determines if the outlet pressure is less than, equal to, or greater than the set-point pressure. Based on this determination, the pilot device 104 manipulates either or both of the inlet and exhaust valves 136, 138 to adjust the pressure in the dome 152. That is, if the sensed outlet pressure is lower than the desired set-point pressure, the on-board controller 154 activates the inlet valve 136 (e.g., instructs the inlet valve 136 to open and the exhaust valve 138 to close). In this configuration, gas enters the inlet port 144 of the pilot device 104 and increases the pressure in the dome 152, which causes the diaphragm assembly 124 to urge the control element 122 downward relative to the orientation of FIG. 2, which opens the regulator 102 and increases flow and ultimately pressure at the outlet 116. In contrast, if the pressure sensed at the outlet 116 by the feedback pressure sensor 106 is determined to be higher than the desired set-point pressure, the on-board controller 154 activates the exhaust valve 138 (e.g., instructs the exhaust valve 138 to open and the inlet valve 136 to close). In this configuration, gas in the dome 152 exhausts out through the exhaust port 146 of the pilot device 104 to decrease the pressure on the top surface 132 of the diaphragm 126. This allows the outlet pressure to urge the diaphragm assembly 124 and control element 122 upward relative to the orientation of FIG. 2, which closes the regulator 102 and decreases flow and ultimately pressure at the outlet 116.

Based on the foregoing description, it should be appreciated that the pilot device 104 and the feedback pressure sensor 106 operate in combination with each other to intermittently, yet frequently, monitor the pressure at the outlet 116 of the regulator 102 and adjust the pressure in the dome 152 until the pressure at the outlet 116 is equal to the set-point pressure.

Figure 3:
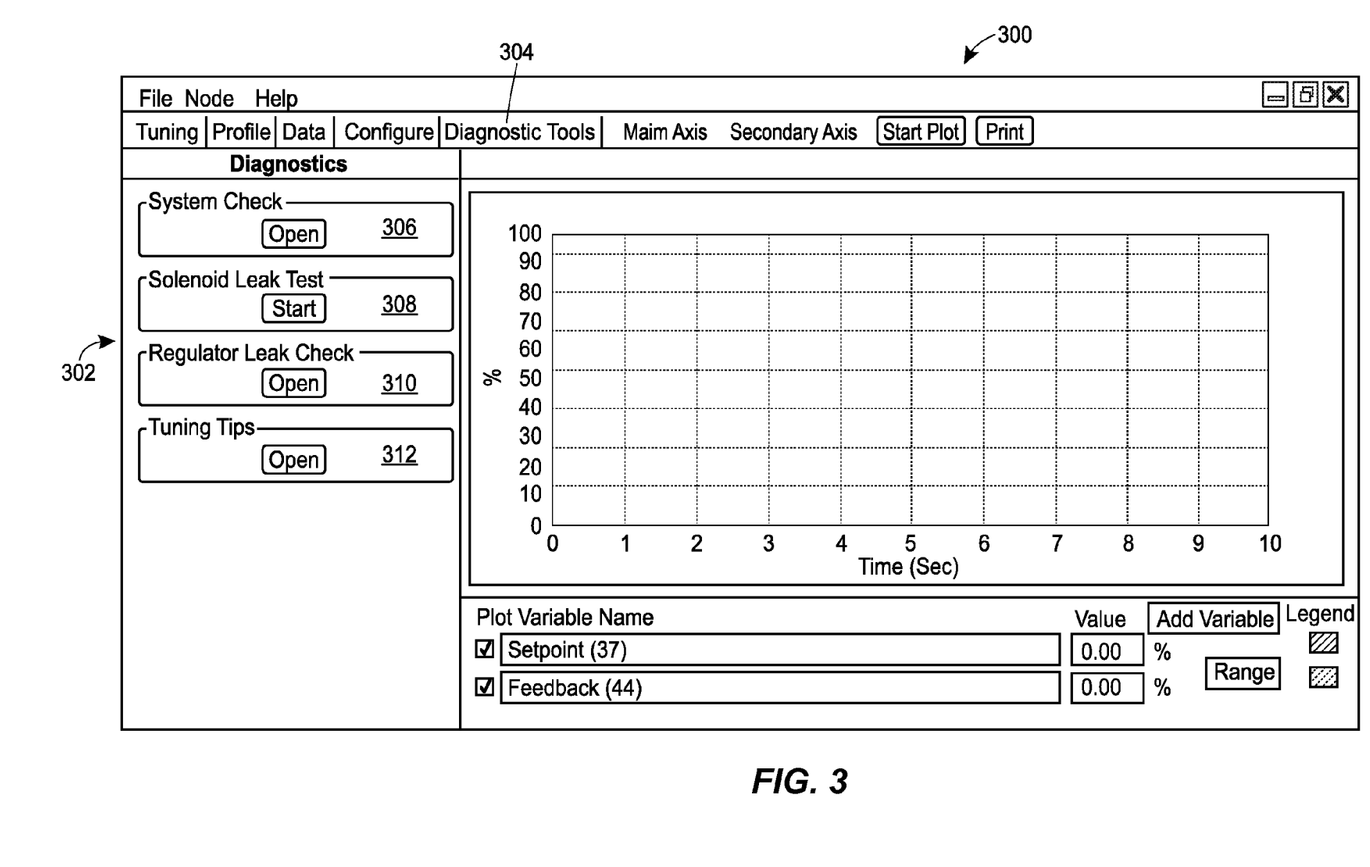
FIG. 3 is a screenshot depicting a list of exemplary diagnostic tools for assessing the integrity of the pressure regulator.

The accuracy of the regulator assembly 100 is vital to the operations of the process control system. To ensure the overall operability of the regulator assembly 100, diagnostic checks of the regulator assembly may be periodically conducted. A diagnostic module may be executed by the processor of the process controller 11 or the on-board processor 154 to provide system personnel with diagnostic tools to maintain the operability of the regulator assembly 100. The diagnostic module may be stored in one of the system's 10 memory devices 12, 78 or downloaded to the system from a remote device. When executed by the one of the processors, the diagnostic module may present a list of diagnostic tools available to control personnel for display on the user interface 14 of the workstation 13. An example page 300 including a list of diagnostic tools 302 is illustrated in FIG. 3 and may be presented for display at the user interface 14 of the workstation 13 in response to the selection of a Diagnostics Tools tab 304. The exemplary list of diagnostic tools 302 available to control personnel may include: system check 306, regulator leak test 310, tuning tips 312, and solenoid leak test 308.

Figure 4:
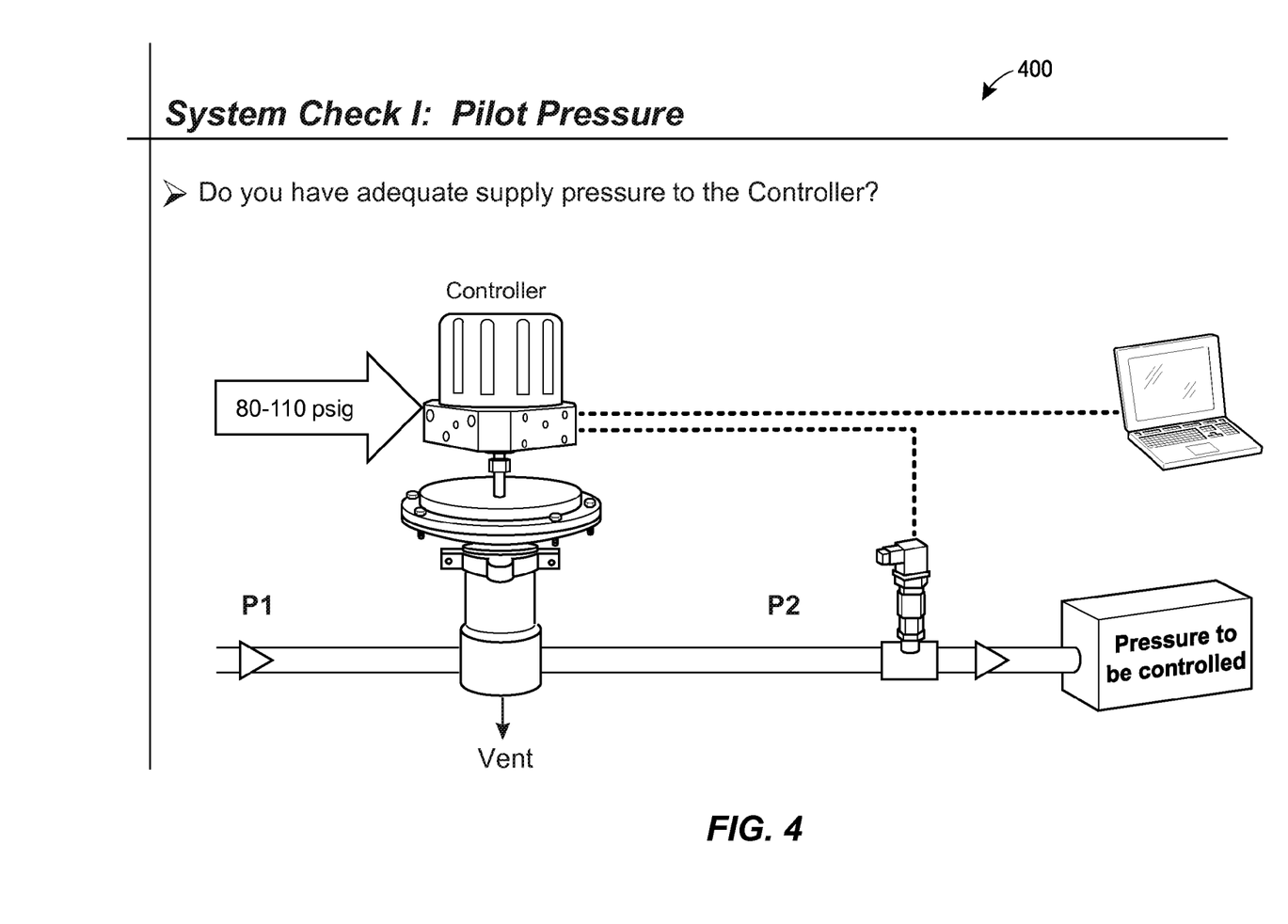
FIG. 4 is a screenshot depicting exemplary information associated with the system check diagnostic tool.

Upon selection of the system check tab 306, system check information may be displayed to the user at the user interface 14 of the workstation 13. The system check information may be provided in the form of a list or a sequence of slides. An example of one slide/page 400 is shown in FIG. 4. The system check information may include prompts to control personnel related to checking supply pressure; checking system pressure; configuration and/or operation of components; control mode settings, e.g., external and/or internal feedback; plotting or graphing system information; sensor settings and displays; and regulator ratio.

Figure 5:
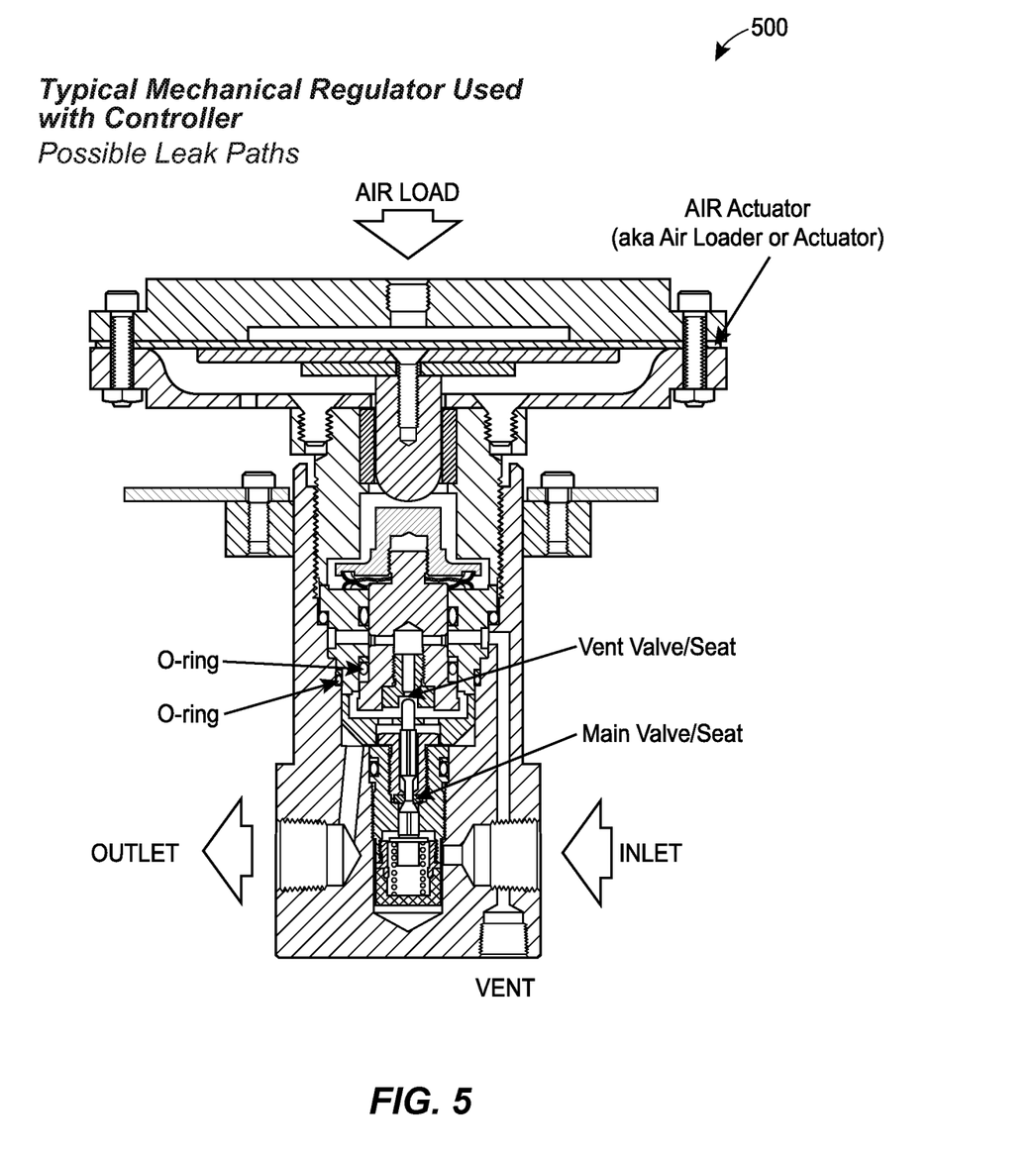
FIG. 5 is a screenshot depicting exemplary information associated with the regulator leak check diagnostic tool.

Upon selection of the regulator leak check tab 310, regulator leak check information may be displayed to the user at the user interface 14 of the workstation 13. The regulator leak check information may be provided in the form of a list or a sequence of slides. An example of one slide/page 500 is shown in FIG. 5. The regulator leak check information may include possible leak paths related to the regulator assembly's main valve, vent valve, o-ring(s), dome, and air actuator.

Figure 6:
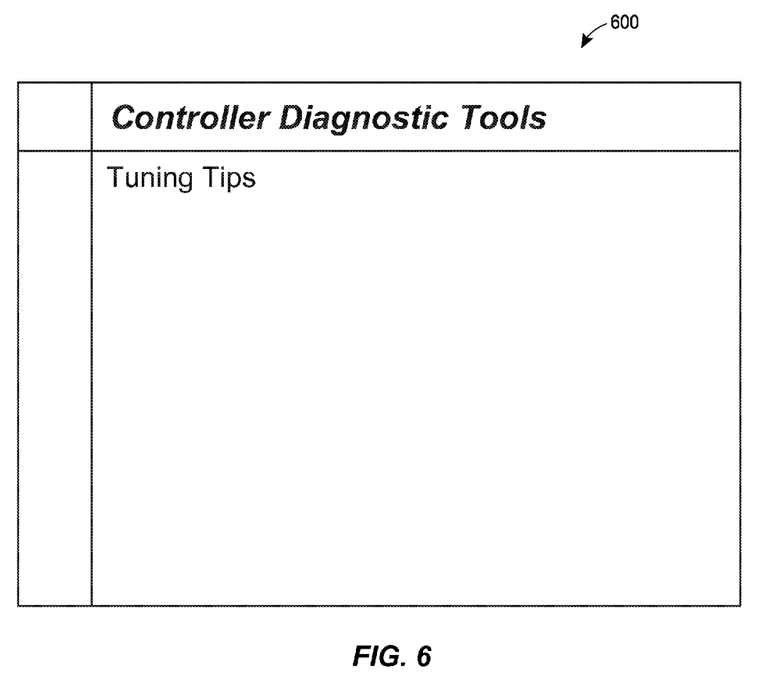
FIG. 6 is a screenshot depicting exemplary information associated with the tuning tips diagnostic tool.

Upon selection of the tuning tips tab 312, information for tuning the regulator assembly 100 may be displayed to the user at the user interface 14 of the workstation 13. The tuning information may be provided in the form of a list or a sequence of slides. An example of one slide/page 600 is shown in FIG. 6. The tuning information may include observed response to changes in parameters and/or set-points; a guide for selecting parameters and/or set-points; and steps to take to achieve a particular response, e.g., type, time, stability, ringing, overshoot, offset/steady state, settling time, rise time, feedback, setpoint(s), setpoint source, oscillation, windup, deadband, integral, derivative, proportional, integral, integral maximum, integral minimum, and frequency.

Figure 7A:
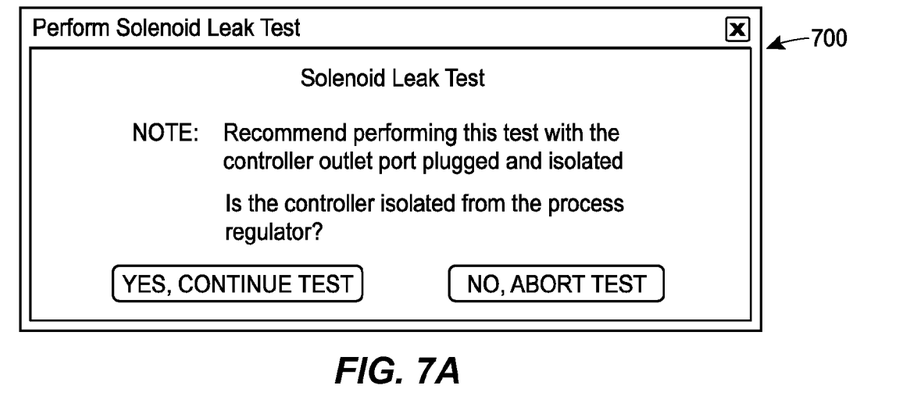
FIGS. 7A-7C depict exemplary screenshots of information provided to the user during the solenoid leak test.
Figure 7B:
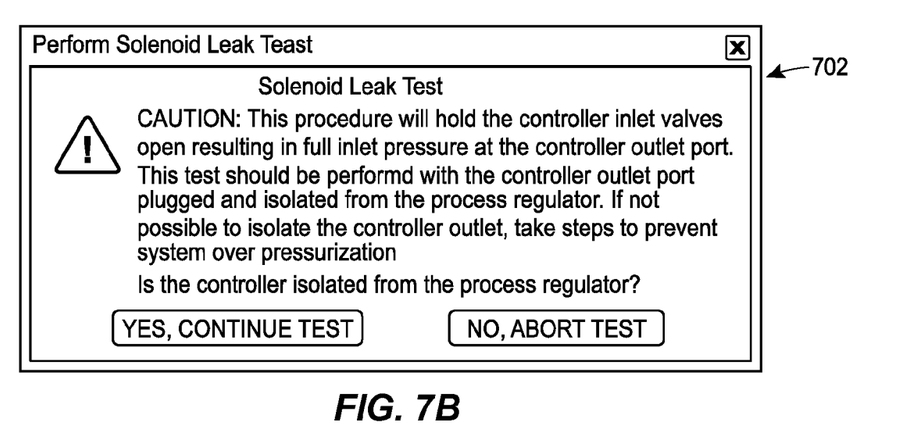
Figure 7C:
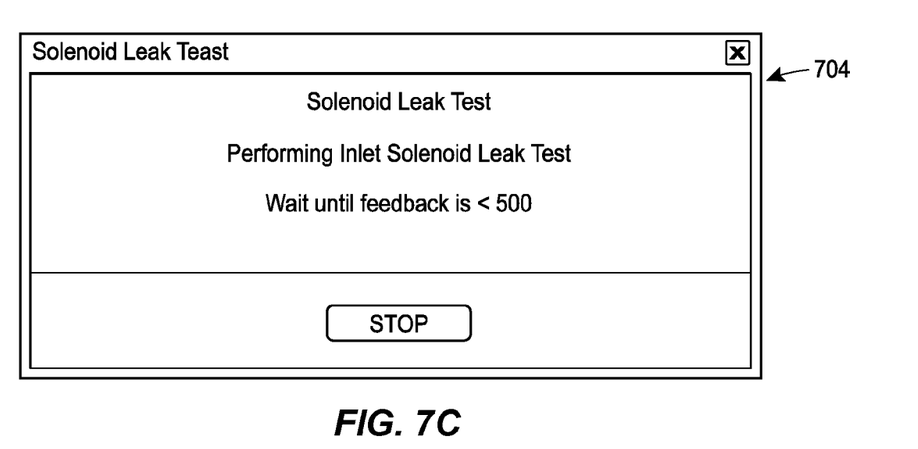

Upon selection of the solenoid leak test tab 308, a solenoid leak test may be automatically executed by the controller and/or in response to a request from control personnel. During execution of the solenoid leak test, a variety of information may appear on the display screen of the workstation to prompt and/or alert the user with respect to the testing process and/or testing results. Some exemplary information related to the solenoid leak test are shown in FIGS. 7A-7C and include: a pop-up window 700 informing the user that the leak test is about to start and requesting confirmation that the solenoid is isolated from the process regulator; a follow-up pop-up window 702 requesting confirmation that the solenoid is isolated from the process regulator; and a pop-up window 704 indicating that the inlet valve test has begun. Other information that is not shown here may include: a pop-up window indicating that the inlet valve test has passed or failed; a pop-up window indicating that an outlet valve test has begun; a pop-up window indicating that the outlet valve test has passed or failed.

Figure 8:
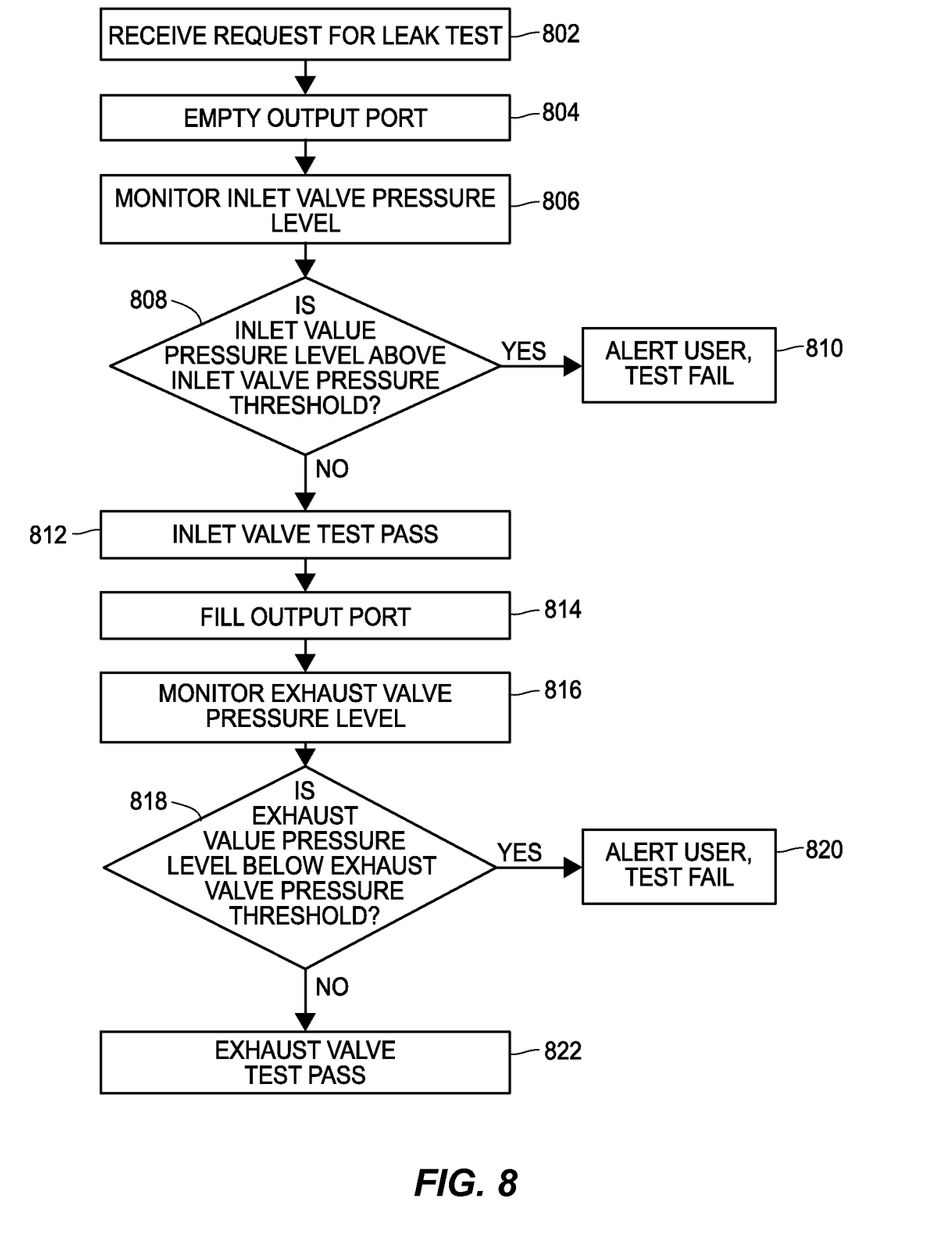
FIG. 8 is a flow diagram of an exemplary solenoid leak test.

A flow diagram 800 of an example solenoid leak test capable of being executed by the controller of the regulator assembly is depicted in FIG. 8. A request to run the solenoid leak test may be received at the processor from the workstation (block 802). Although the solenoid leak test may be automatically executed by one or more processors, the test may be configured to allow the user to intervene. During the solenoid leak test, both the inlet valve 136 and the exhaust valve 138 are in a closed position and one or both valves may be tested. To test the inlet valve, a signal is sent from the processor to empty the controlled output port (block 804). After emptying the output port, an inlet valve pressure level associated with the output port is preferably near 0 psi. The pressure sensor associated with the outlet port 148 monitors the inlet valve pressure level of the outlet port for a period of time, for example, 30 seconds (block 806). The monitored inlet valve pressure level is compared to an inlet valve pressure threshold (block 808). If the monitored inlet valve pressure level rises to meet or exceed the inlet valve pressure threshold, the inlet valve may be leaking (block 810). The inlet valve pressure threshold may be set at 0.3 psi above the inlet valve pressure level measured at the start of the inlet valve test. If the monitored inlet valve pressure level remains below the inlet valve pressure threshold throughout the duration of the test, the inlet valve is considered to have passed the test (block 812). Upon completion of the inlet valve test, the exhaust valve may be tested. A signal is sent from the processor to fill the controlled output port to an exhaust valve pressure level of approximately 100 psi (block 814). The pressure sensor associated with the outlet port 148 monitors the exhaust valve pressure level for a period of time, for example, 30 seconds (block 816). The monitored exhaust valve pressure level of the outlet port is compared to an exhaust valve pressure threshold (block 818) and if the monitored exhaust valve pressure level falls to or below the exhaust valve pressure threshold, the exhaust valve may be leaking (block 820). The exhaust valve pressure threshold level may be set at 0.3 psi below the exhaust valve pressure level present at the start of the exhaust valve test. If the monitored exhaust valve pressure level remains above the exhaust valve pressure threshold throughout the duration of the test, the exhaust valve is considered to have passed the test (block 822).

It is to be understood that either or both of the inlet and exhaust valve tests may be executed in any order. That is, only the inlet valve test may be performed, only the exhaust valve test may be performed, or both tests be may performed, wherein the inlet valve test may be performed before or after the exhaust valve test. The results of the inlet and/or exhaust valve tests may be provided to the user at various locations. For example, the test results may be presented at the user interface 14 of the workstation 13 or the display screen of the computing device 108. In addition, the test results may be transmitted to the user via wired or wireless communication to a mobile computing device, such as a phone, tablet, laptop, etc.

It is apparent from the description above that the productivity of control personnel may be improved by utilizing the diagnostic tools described herein to evaluate the integrity of interior valves. Control personnel are able to quickly assess and identify faulty and/or poor performing valves and determine whether other areas within the control system should be investigated.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the control system 10 may include, but is not limited to, any combination of a LAN, a MAN, a WAN, a mobile, a wired. or a wireless network, a private network, or a virtual private network. Moreover, while only two workstations are illustrated in FIG. 1 to simplify and clarify the description, it is understood that any number of workstations or user interfaces are supported and can be implemented.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively or communicably, or operatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a plant environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a plant or office environment). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines, and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," and the like. These words, however, are merely convenient labels and are to be associated with appropriate physical quantities.

Unless specifically stated otherwise, discussions herein using words such as "processing," "computing," "calculating," "determining," "presenting," "displaying," and the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, for the purposes of illustration only, the figures depict preferred embodiments of a system and method for diagnosing a field device within a process control system. One skilled in the art will readily recognize from the discussion above that alternative embodiments of the structures and methods illustrated herein may be employed without departing from the principles described herein.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f) and/or pre-AIA 35 U.S.C. §112, sixth paragraph.

Of course, the applications and benefits of the systems, methods, and techniques described herein are not limited to only the above examples. Many other applications and benefits are possible by using the systems, methods, and techniques described herein. Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects.

Aspect 1—A method for diagnosing a pressure regulator in a process control system, the method comprising: receiving, at a processor, a request to execute a diagnostic application, the request being initiated from a user interface communicably coupled to the process control system; displaying, at the user interface, a diagnostics page in response to receiving a request to execute a diagnostic application, the diagnostic page including a selectable item associated with a diagnostic tool; receiving, at a processor, a selection of the selectable item; and automatically executing, at a processor, a command associated with the diagnostic tool.

Aspect 2—The method of aspect 1, wherein the diagnostic tool is a valve leak test, which when executed by the processor, automatically tests an inlet valve and/or an exhaust valve of the pressure regulator.

Aspect 3—The method of any one of aspects 1-2, wherein the valve leak test includes; displaying, via a user interface, a message requesting confirmation that an outlet port of the pressure regulator has been plugged and isolated; receiving, via a processor, a confirmation that the outlet port has been plugged and isolated; transmitting, via a processor, a signal to set the pressure at a location associated with the output port to an inlet valve pressure level; monitoring, via a processor, the inlet valve pressure level; executing, via a processor, a first command if the inlet valve pressure level is at or above an inlet valve pressure threshold within a first period of time; executing, via a processor, a second command if the inlet valve pressure level is below the inlet valve pressure threshold within the first period of time; transmitting a signal, via a processor, to set the pressure at the location associated with the output port to an exhaust valve pressure level; monitoring, via a processor, the exhaust valve pressure level; executing, via a processor, a third command if the exhaust valve pressure level is at or below an exhaust valve pressure threshold within a second period of time; and executing, via a processor, a fourth command if the exhaust valve pressure level is above the exhaust valve pressure threshold within the second period of time.

Aspect 4—The method of any one of aspects 1-3, wherein executing a first command includes transmitting a failure message associated with the inlet valve.

Aspect 5—The method of any one of aspects 1-4, wherein executing a second command includes transmitting a pass message associated with the inlet valve.

Aspect 6—The method of any one of aspects 1-5, wherein executing a third command includes transmitting a failure message associated with the exhaust valve.

Aspect 7—The method of any one of aspects 1-6, wherein executing a fourth command includes transmitting a pass message associated with the exhaust valve.

Aspect 8—The method of any one of aspects 1-7, wherein the first period of time is equal to the second period of time.

Aspect 9—The method of any one of aspects 1-8, wherein the first period of time is 30 seconds.

Aspect 10—The method of any one of aspects 1-9, wherein the second period of time is 30 seconds.

Aspect 11—The method of any one of aspects 1-10, wherein the inlet valve threshold level is 0.3 psi above the set inlet valve pressure level.

Aspect 12—The method of any one of aspects 1-11, wherein the exhaust valve threshold level is 0.3 psi below the set exhaust valve pressure level.

Aspect 13—The method of any one of aspects 1-12, wherein the diagnostic tool is a system check, which when executed by the processor, automatically displays information at the user interface related to operational parameters of the pressure regulator.

Aspect 14—The method of any one of aspects 1-13, wherein the diagnostic tool is a mechanical regulator leak test, which when executed by the processor, automatically displays information for testing a mechanical regulator of the pressure regulator.

Aspect 15—The method of any one of aspects 1-14, wherein the diagnostic tool is a tuning procedure, which when executed by the processor, automatically displays information for tuning the pressure regulator.

Aspect 16—A diagnostic apparatus for a control system having a controller operatively connected to a pressure regulator, the diagnostic apparatus comprising: a processor operatively coupled to the pressure regulator; a memory operatively coupled to the processor; a sensor operatively coupled to an inlet valve of the pressure regulator, an exhaust valve of the pressure regulator, and the processor; a user interface operatively coupled to the processor; and a diagnostic module stored in the memory, the diagnostic module, when executed by the processor, presents a diagnostic tool at the user interface.

Aspect 17—The diagnostic apparatus of aspect 16, wherein the diagnostic tool is a valve leak test, which when executed by the processor, automatically tests an inlet valve and/or an exhaust valve of the pressure regulator.

Aspect 18—The diagnostic apparatus of any one of aspects 16-17, wherein the diagnostic tool is a system check, which when executed by the processor, automatically displays information at the user interface related to operational parameters of the pressure regulator.

Aspect 19—The diagnostic apparatus of any one of aspects 16-18, wherein the diagnostic tool is a mechanical regulator leak test, which when executed by the processor, automatically displays information for testing a mechanical regulator of the pressure regulator.

Aspect 20—The diagnostic apparatus of any one of aspects 16-19, wherein the diagnostic tool is a tuning procedure, which when executed by the processor, automatically displays information for tuning the pressure regulator.

Aspect 21—A tangible non-transitory computer-readable medium having instructions stored thereon that, when executed by one or more processors, causes the one or more processors to: display a message requesting confirmation that an outlet port of the pressure regulator has been plugged and isolated; receive a confirmation that the outlet port has been plugged and isolated; transmit a signal to set the pressure at a location associated with the output port to an inlet valve pressure level; monitor the inlet valve pressure level; execute a first command if the inlet valve pressure level is at or above an inlet valve pressure threshold within a first period of time; execute a second command if the inlet valve pressure level is below the inlet valve pressure threshold within the first period of time; transmit a signal to set the pressure at the location associated with the output port to an exhaust valve pressure level; monitor the exhaust valve pressure level; execute a third command if the exhaust valve pressure level is at or below an exhaust valve pressure threshold within a second period of time; and execute a fourth command if the exhaust valve pressure level is above the exhaust valve pressure threshold within the second period of time.

Aspect 22—The tangible non-transitory computer-readable medium of aspect 21 having a further instruction stored thereon that, when executed by one or more processors, causes the one or more processors to transmit an alert associated with the command to a workstation.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method for diagnosing a pressure regulator in a process control system, the method comprising:
   receiving, at a processor, a request to execute a diagnostic application, the request being initiated from a user interface communicably coupled to the process control system;
   displaying, at the user interface, a diagnostics page in response to receiving a request to execute a diagnostic application, the diagnostic page including a selectable item associated with a diagnostic tool;
   receiving, at a processor, a selection of the selectable item; and
   automatically executing, at a processor, a command associated with the diagnostic tool.

2. The method of claim 1, wherein the diagnostic tool is a valve leak test, which when executed by the processor, automatically tests an inlet valve and/or an exhaust valve of the pressure regulator.

3. The method of claim 2, wherein the valve leak test includes;
   displaying, via a user interface, a message requesting confirmation that an outlet port of the pressure regulator has been plugged and isolated;
   receiving, via a processor, a confirmation that the outlet port has been plugged and isolated;
   transmitting, via a processor, a signal to set the pressure at a location associated with the output port to an inlet valve pressure level;
   monitoring, via a processor, the inlet valve pressure level;
   executing, via a processor, a first command if the inlet valve pressure level is at or above an inlet valve pressure threshold within a first period of time;
   executing, via a processor, a second command if the inlet valve pressure level is below the inlet valve pressure threshold within the first period of time;
   transmitting a signal, via a processor, to set the pressure at the location associated with the output port to an exhaust valve pressure level;
   monitoring, via a processor, the exhaust valve pressure level;
   executing, via a processor, a third command if the exhaust valve pressure level is at or below an exhaust valve pressure threshold within a second period of time; and
   executing, via a processor, a fourth command if the exhaust valve pressure level is above the exhaust valve pressure threshold within the second period of time.

4. The method of claim 3, wherein executing a first command includes transmitting a failure message associated with the inlet valve.

5. The method of claim 3, wherein executing a second command includes transmitting a pass message associated with the inlet valve.

6. The method of claim 3, wherein executing a third command includes transmitting a failure message associated with the exhaust valve.

7. The method of claim 3, wherein executing a fourth command includes transmitting a pass message associated with the exhaust valve.

8. The method of claim 3, wherein the first period of time is equal to the second period of time.

9. The method of claim 3, wherein the first period of time is 30 seconds.

10. The method of claim 3, wherein the second period of time is 30 seconds.

11. The method of claim 3, wherein the inlet valve threshold level is 0.3 psi above the set inlet valve pressure level.

12. The method of claim 3, wherein the exhaust valve threshold level is 0.3 psi below the set exhaust valve pressure level.

13. The method of claim 1, wherein the diagnostic tool is a system check, which when executed by the processor, automatically displays information at the user interface related to operational parameters of the pressure regulator.

14. The method of claim 1, wherein the diagnostic tool is a mechanical regulator leak test, which when executed by the processor, automatically displays information for testing a mechanical regulator of the pressure regulator.

15. The method of claim 1, wherein the diagnostic tool is a tuning procedure, which when executed by the processor, automatically displays information for tuning the pressure regulator.

16. A diagnostic apparatus for a control system having a controller operatively connected to a pressure regulator, the diagnostic apparatus comprising:
   a processor operatively coupled to the pressure regulator;
   a memory operatively coupled to the processor;
   a sensor operatively coupled to an inlet valve of the pressure regulator, an exhaust valve of the pressure regulator, and the processor;
   a user interface operatively coupled to the processor; and
   a diagnostic module stored in the memory, the diagnostic module including instructions that when executed by the processor,
      receive a request to execute a diagnostic application, the request being initiated from a user interface communicably coupled to the process control system,
      display a diagnostics page in response to receiving the request to execute the diagnostic application, the diagnostic page including a selectable item associated with a diagnostic tool,
      receive a selection of the selectable item, and
      automatically execute a command associated with the diagnostic tool.

17. The diagnostic apparatus of claim 16, wherein the diagnostic tool is a valve leak test, which when executed by the processor, automatically tests an inlet valve and/or an exhaust valve of the pressure regulator.

18. The diagnostic apparatus of claim 16, wherein the diagnostic tool is a system check, which when executed by the processor, automatically displays information at the user interface related to operational parameters of the pressure regulator.

19. The diagnostic apparatus of claim 16, wherein the diagnostic tool is a mechanical regulator leak test, which when executed by the processor, automatically displays information for testing a mechanical regulator of the pressure regulator.

20. The diagnostic apparatus of claim 16, wherein the diagnostic tool is a tuning procedure, which when executed by the processor, automatically displays information for tuning the pressure regulator.

21. A tangible non-transitory computer-readable medium having instructions stored thereon that, when executed by one or more processors, causes the one or more processors to:

display a message requesting confirmation that an outlet port of the pressure regulator has been plugged and isolated;
receive a confirmation that the outlet port has been plugged and isolated;
transmit a signal to set the pressure at a location associated with the output port to an inlet valve pressure level;
monitor the inlet valve pressure level;
execute a first command if the inlet valve pressure level is at or above an inlet valve pressure threshold within a first period of time;
execute a second command if the inlet valve pressure level is below the inlet valve pressure threshold within the first period of time;
transmit a signal to set the pressure at the location associated with the output port to an exhaust valve pressure level;
monitor the exhaust valve pressure level;
execute a third command if the exhaust valve pressure level is at or below an exhaust valve pressure threshold within a second period of time; and
execute a fourth command if the exhaust valve pressure level is above the exhaust valve pressure threshold within the second period of time.

22. The tangible non-transitory computer-readable medium of claim 21 having a further instruction stored thereon that, when executed by one or more processors, causes the one or more processors to transmit an alert associated with the command to a workstation.

* * * * *